United States Patent
Riehle et al.

(12) 
(10) Patent No.: US 6,402,227 B1
(45) Date of Patent: Jun. 11, 2002

(54) WIND STOP DEVICE

(75) Inventors: Joerg Riehle, Stuttgart; Hans Riehle, Ludwigsburg; Istvan Bornemissza, Moeglingen, all of (DE)

(73) Assignee: Oris Fahrzeugteile Hans Riehle GmbH, Moeglingen (DE)

( * ) Notice: Subject to any disclaimer, the term of this patent is extended or adjusted under 35 U.S.C. 154(b) by 0 days.

(21) Appl. No.: 09/665,792

(22) Filed: Sep. 20, 2000

Related U.S. Application Data

(63) Continuation of application No. PCT/EP00/00388, filed on Jan. 19, 2000.

(30) Foreign Application Priority Data

Jan. 21, 1999 (DE) .......................................... 199 02 242

(51) Int. Cl.⁷ .................................................. B60J 7/22
(52) U.S. Cl. .................................................. 296/180.1
(58) Field of Search .................. 296/180.1, 146.16, 296/85; 280/756

(56) References Cited

U.S. PATENT DOCUMENTS 5,056,816 A * 10/1991 Lutze et al. ............ 280/756 X
5,195,799 A   3/1993 Götz et al.

FOREIGN PATENT DOCUMENTS

| | | |
|---|---|---|
| DE | 82 26 160 | 10/1983 |
| DE | 39 23 558 | 3/1990 |
| DE | 39 35 630 | 5/1991 |
| DE | 40 39 411 | 6/1992 |
| DE | 41 19 530 | 12/1992 |
| DE | 43 35 103 | 11/1994 |
| DE | 43 38 102 | 5/1995 |
| DE | 44 05 707 | 8/1995 |
| DE | 197 05 589 | 8/1998 |
| DE | 197 05 682 | 8/1998 |
| DE | 197 38 795 | 10/1998 |
| DE | 19910060 A1 * | 9/2000 |
| EP | 0 487 843 | 6/1992 |
| EP | 0 718 135 | 6/1996 |
| EP | 0 887 217 | 12/1998 |
| EP | 0 965 470 | 12/1999 |

* cited by examiner

*Primary Examiner*—Joseph D. Pape
*Assistant Examiner*—Jason Morrow
(74) *Attorney, Agent, or Firm*—Barry R. Lipsitz

(57) ABSTRACT

In order to improve a wind stop device for motor vehicles, comprising a wind stop element, a holder for the wind stop element mountable so as to engage a receiving space of a motor vehicle body, the wind stop element being mounted on the holder in such a way that it can be brought from an active position projecting above a girth line of the motor vehicle body to an inactive position lying essentially within an outer contour of the motor vehicle body and vice versa, such that manual transfer from the inactive position to the active position and vice versa can be dispensed with, it is proposed that the wind stop element be transferable between the inactive position and the active position by means of a lifting device provided with an electric drive.

24 Claims, 7 Drawing Sheets

Figure 1:
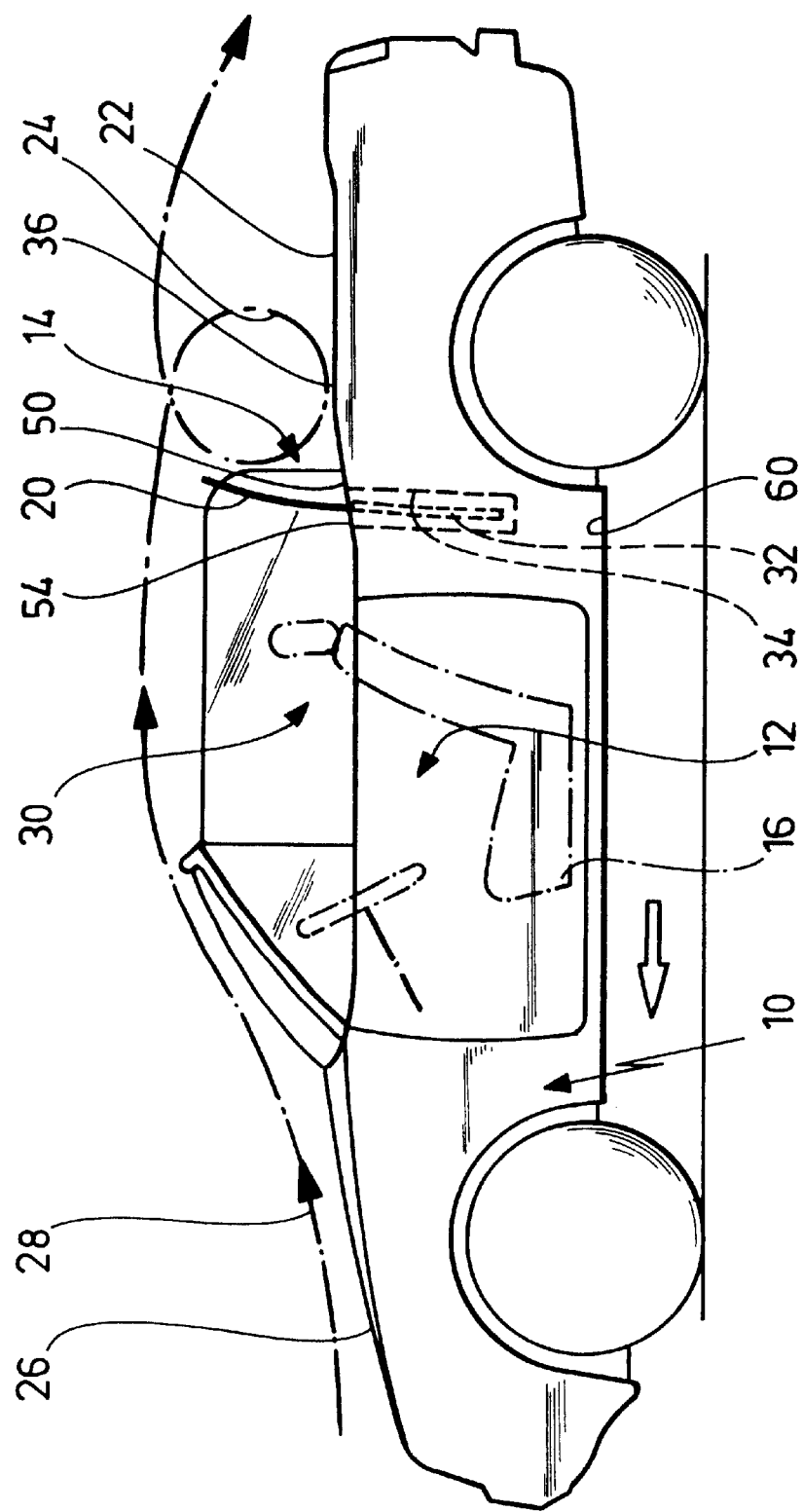

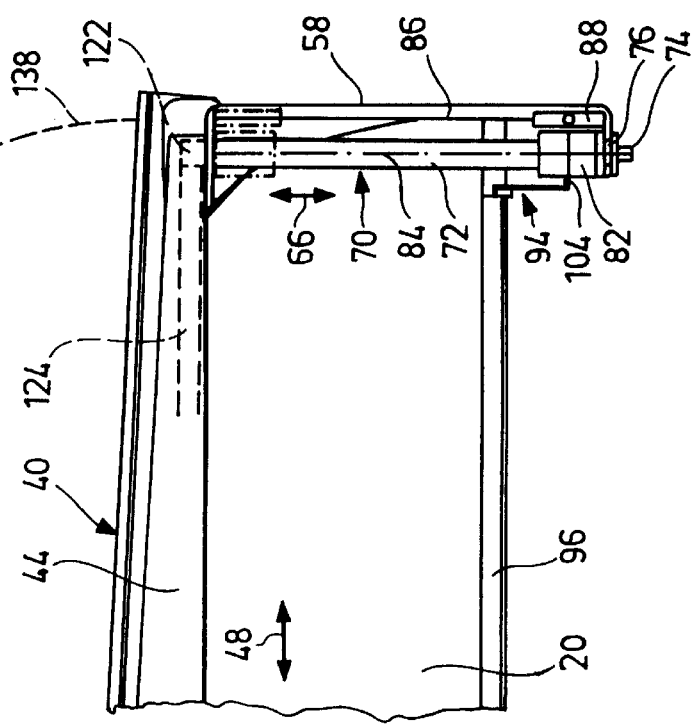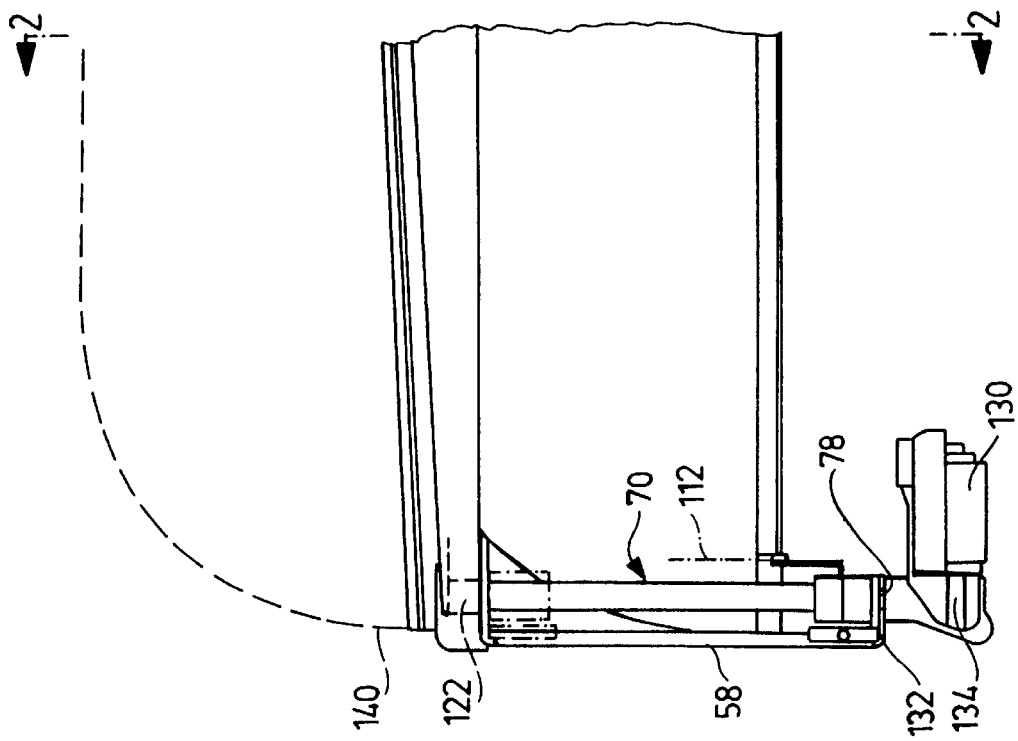
FIG.4

WIND STOP DEVICE

This application is a continuation of international application number PCT/EP00/00388 filed Jan. 21, 1999.

The invention relates to a wind stop device for motor vehicles, comprising a wind stop element, a holder for the wind stop element mountable so as to engage a receiving space of a motor vehicle body, the wind stop element being mounted on the holder in such a way that it can be brought from an active position projecting above a girth line of the motor vehicle body to an inactive position lying essentially within an outer contour of the motor vehicle body and vice versa.

Such wind stop devices are known from the prior art. The problem with these is that transfer thereof from the inactive position to the active position requires complex movements which have to be carried out manually.

The object underlying the invention is therefore to so improve a wind stop device of the generic kind that a manual transfer from the inactive position to the active position and vice versa can be dispensed with.

This object is accomplished with a wind stop device of the kind described at the outset, in accordance with the invention, in that the wind stop element is transferable between the inactive position and the active position by means of a lifting device provided with an electric drive.

The advantage of the solution according to the invention is to be seen in that convenient movement of the wind stop device between the active position and the inactive position is achievable, and, in particular, a lifting device offers a simple kinematic possibility to move the wind stop element by means of an electric drive between the inactive position and the active position.

In principle, the design of the lifting device is optional. For example, it is conceivable to provide as lifting device a type of "lazy tongs" with which lifting of the wind stop element and lowering of the wind stop element are achievable.

However, a particularly suitable solution provides for the lifting device to comprise two lifting units arranged at a distance from one another in a transverse direction. Such an arrangement of the lifting units has the advantage that with these a stable, tilt-free positioning of the wind stop element in the respective positions is possible, and, in particular, also in the intermediate positions between the inactive position and the active position a precise guidance of the wind stop element can take place, which is a prerequisite for achieving a movability of the wind stop element which is insusceptible to failure.

In order to suitably arrange the two lifting units, it is preferably provided for the holder to comprise two supports on which the lifting units are arranged, with the supports being arranged at a distance from one another in the transverse direction and extending in a lifting direction. Such an implementation of the holder creates, in particular, the possibility of simple assembly, as the entire holder for the wind stop device also simultaneously constitutes via the supports a holder for the lifting units.

Furthermore, a sufficiently stable arrangement of the wind stop element provides for the wind stop element to be guided by means of an exit guide arranged near an exit opening provided for the wind stop element in the body. Such an exit guide for the wind stop element located near the exit opening is advantageous for positioning the wind stop element in a stable and reliable manner in its active position and can also be used to keep the wind stop element guided in a defined manner in its inactive position so that a trouble-free functioning of the wind stop device is guaranteed by a mechanically precise guidance throughout the period of use.

It is particularly suitable for the exit guide to be arranged on the holder because, on the one hand, in the manufacture and assembly of the wind stop device the location of the exit guide can likewise be specified in a defined manner relative to the holder and, therefore, in particular when the lifting units are also arranged on the holder, a prefabrication of the wind stop device for assembly is possible, with the entire relative positioning of lifting units, exit guide and wind stop element being predeterminable with the necessary precision before the assembly of the wind stop device in the motor vehicle body so as to avoid during assembly or after assembly any need for an exact positioning or adjustment of the individual components relative to one another.

Further details of the function of the lifting units themselves were not given in connection with the above explanation of the embodiments. An advantageous embodiment of the inventive solution provides for the lifting units to be coupled with one another in such a way that all the positions of the wind stop element attainable by these are aligned parallel to one another. Such a coupling of the lifting units makes it possible for the wind stop element during movement between the active and the inactive positions to always move between positions aligned parallel with one another and to thereby guarantee optimum mechanical guidance of the wind stop element on the holder. Moreover, such a guidance is advantageous insofar as it ensures a trouble-free, jerk-free running of the wind stop element, and, on the other hand, consequently also a prolonged life span of the lifting device.

In principle, it is conceivable to couple the two lifting units with one another via a control, for example, electronically, so that they move the wind stop element in the required manner into positions parallel to one another.

However, it is particularly simple and cost-efficient for the two lifting units to be movable in mechanical synchronization with one another. Such a mechanical synchronization can, for example, be imposed via lever linkages or tractive elements.

This can, however, be achieved particularly simply when the lifting units are coupled with one another by a connecting transmission.

Such a connecting transmission which, in particular, extends in the transverse direction between the lifting units, can be arranged in many different ways. For example, a conceivable possibility is to provide separate elements on the holder therefor. A particularly suitable solution provides for the connecting transmission to be arranged in the area of a crossbeam of the holder.

Herein, the crossbeam can be arranged at optional positions on the holder. It is, however, particularly suitable for the connecting transmission to be arranged in the area of an upper crossbeam of the holder, which is preferably provided near the exit opening for the wind stop element on the body and in the most suitable case also carries the exit guide.

The lifting units according to the invention can be driven individually. For example, even with mechanically imposed synchronization it is possible to drive each of the lifting units by means of a drive motor. This would, for example, have the advantage that the lifting units could be constructed as identical units with the synchronization taking place in each case via mechanical connections, which, for example, with electric drives impose a synchronous movement.

It is, however, particularly advantageous, in particular in order to obtain a cost-efficient solution, for both lifting units to be drivable by means of a single electric drive.

Very different solutions are conceivable for the design of the lifting units. For example, it is conceivable to design the lifting units in the form of telescopic cylinders.

However, these involve high space requirements. For this reason, a particularly suitable solution is for each of the lifting units to comprise a lifting transmission which acts upon the wind stop element.

Such a lifting transmission could, for example, take the form of an endless, rotatingly mounted strand which is coupled with the wind stop element via an engagement point.

However, a particularly suitable solution provides for each lifting transmission to comprise a lifting spindle with a spindle nut. Such a lifting transmission design has the considerable advantage that large forces are easily generated with a lifting spindle and a spindle nut moved by the lifting spindle, and, in addition, a precise guidance of the spindle nut is guaranteed.

To be able to work with a large thread pitch it is advantageous for a multiple thread to be used.

In particular, lifting spindles are also easy to couple with one another mechanically so as to obtain a synchronous movement of the two lifting units relative to one another.

In principle, it is conceivable to already achieve guidance of the wind stop element in the lifting direction via the lifting transmission, in particular, the lifting spindle.

However, in order to achieve easy running and, at the same time, precise guidance of the wind stop element during movement between the inactive position and the active position, it has proven to be advantageous for each of the lifting units to comprise a path guide extending in the lifting direction for the wind stop element.

Such a path guide is coupled, in particular, with a lower area of the wind stop element and guides it, preferably in addition to the guidance of the wind stop element by means of the exit guide.

Many different possibilities are conceivable for the arrangement of the path guide relative to the lifting transmission. One simple possibility provides for the path guide to extend alongside the lifting transmission, and so, on the one hand, the drive and, at the same time, the guide of the wind stop element are located close to one another in the area of each lifting unit.

In particular, it is advantageous for the path guide to be arranged on the supports for the lifting units so that two assemblies provided on the holder are formed, each of which is usable, on the one hand, for the drive, and, on the other hand, for the exact guidance of the wind stop element.

In order to avoid, at the same time, an excess geometrical determination of the lifting transmission when using a path guide, and, consequently, a possible impairment of the lifting transmission by "jamming" owing to this excess geometrical determination, it is preferably provided for the wind stop element to be coupled with each of the lifting transmissions via a lift bearing allowing a tilting transversely to the lifting direction.

In particular, such a lift bearing is advantageous when on account of its shape the wind stop element is movable not in one plane only, but, for example, owing to a curvature thereof, can perform additional movements transversely to the plane. This can, for example, be achieved by means of such a lift bearing.

Moreover, either the path guide is adapted to the movement to be carried out by the wind stop element, or also movability of the coupling between the path guide and movement of the wind stop element is provided. For example, the connecting element between path guide and wind stop element can also be designed so as to allow a relative movement so that the path guide represents a linear guidance, while the lifting element carries out additional movements transversely to the plane provided by the path guide.

To be able to construct the wind stop element according to the invention in as space-saving a way as possible, and, in particular, to keep the receiving space in the motor vehicle as small as possible, it is preferably provided for the lifting device to extend essentially over an area over which the wind stop element extends in its inactive position. This means that the space requirement of the lifting device does not substantially exceed the space requirement of the wind stop element in its inactive position, however, the lifting device can extend slightly beyond the wind stop element in the inactive position.

It is particularly expedient for the lifting units of the lifting device to extend essentially over the area over which the wind stop element extends when standing in the inactive position so that, in particular, the space requirement for the lifting units is not appreciably larger than the space requirement for the wind stop element when standing in the inactive position. However, this does not exclude the lifting units extending partly with end portions beyond the wind stop element in its inactive position, as this is absolutely necessary on account of geometric conditions if the wind stop element is to be reliably guided by the lifting units, on the one hand, in its inactive position, and, on the other hand, in its active position.

Furthermore, in order to suitably arrange the lifting transmissions, it is preferably provided for the lifting transmissions to lie in a plane extending approximately parallel to the wind stop element in its inactive position.

The space requirement in the transverse direction can be configured in a particularly suitable way by the lifting transmissions lying in the transverse direction between maximally outwardly located side edges of the wind stop element in its inactive position because the lifting transmissions cause no widening of the wind stop device in the transverse direction and so the wind stop element itself can extend in the transverse direction over a maximum possible width relative to the motor vehicle body.

Also for the arrangement of the path guides it is suitable for these to run in a plane extending approximately parallel to the wind stop element in its inactive position so that the path guides as well have no additional space requirement in the transverse direction.

Further details of the design of the wind stop element itself were so far not given. One possibility provides for the wind stop element to be formed from a rigid material shaped like a plate. Such a rigid material shaped like a plate could, for example, be a metal sheet having perforations. It is, however, also conceivable to form the wind stop element from a plate of translucent material, for example, glass or transparent plastic, which may or may not have perforations.

Another advantageous possibility provides for the wind stop element to comprise a rigid frame with an insert, for example, a covering, with the insert being transparent. This can be in the form of either a translucent material or a flat material having perforations, for example, net-like material. This material may, for example, also be pervious to air.

Moreover, it is conceivable, in particular, in order to save space in the motor vehicle body, to deform the wind stop element itself during movement between the active position and the inactive position. For example, the wind stop element could be additionally unfolded or at least its shape enlarged when moving from the inactive position to the active position.

It is particularly suitable for the wind stop element to be movable in a form-invariant manner between the active position and the inactive position, because, on the one hand, this allows a simple design of the wind stop element, and, on the other hand, represents a simple solution provided with a drive, which, in particular, operates extremely reliably with respect to the mechanical functioning.

Further features and advantages of the invention are the subject of the following description as well as the drawings of several embodiments.

THE DRAWINGS SHOW

Figure 2:
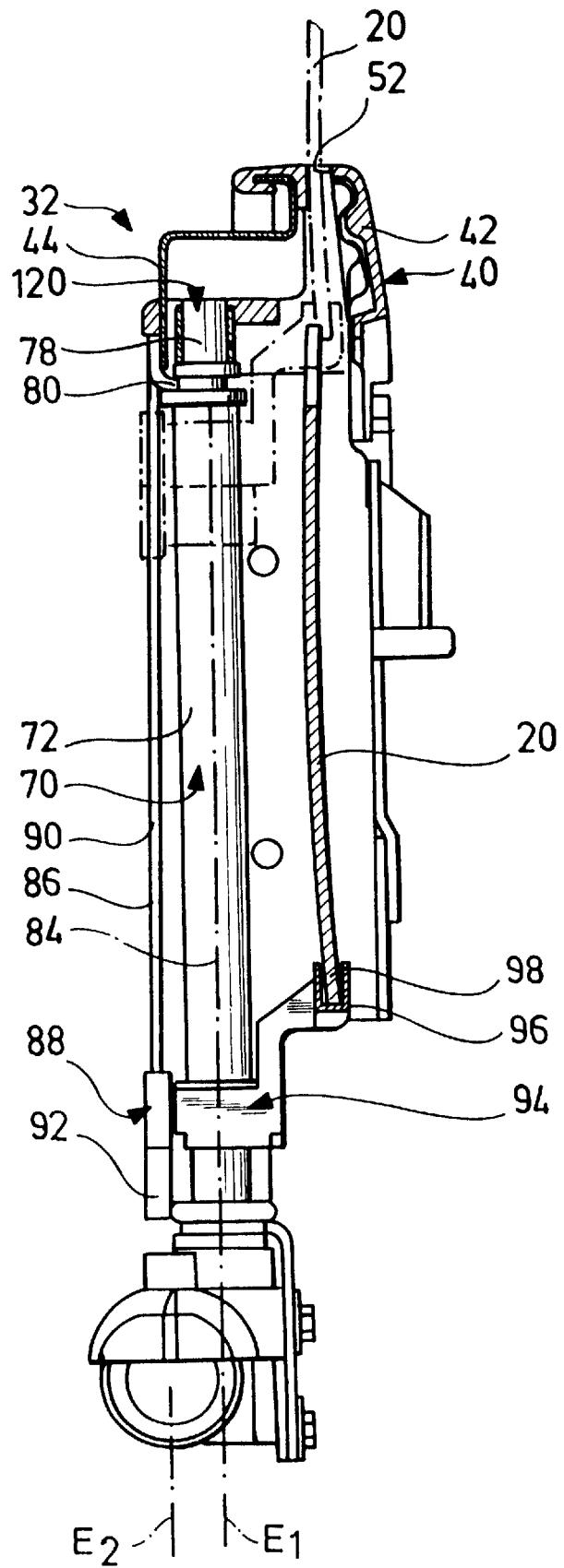
Figure 3:
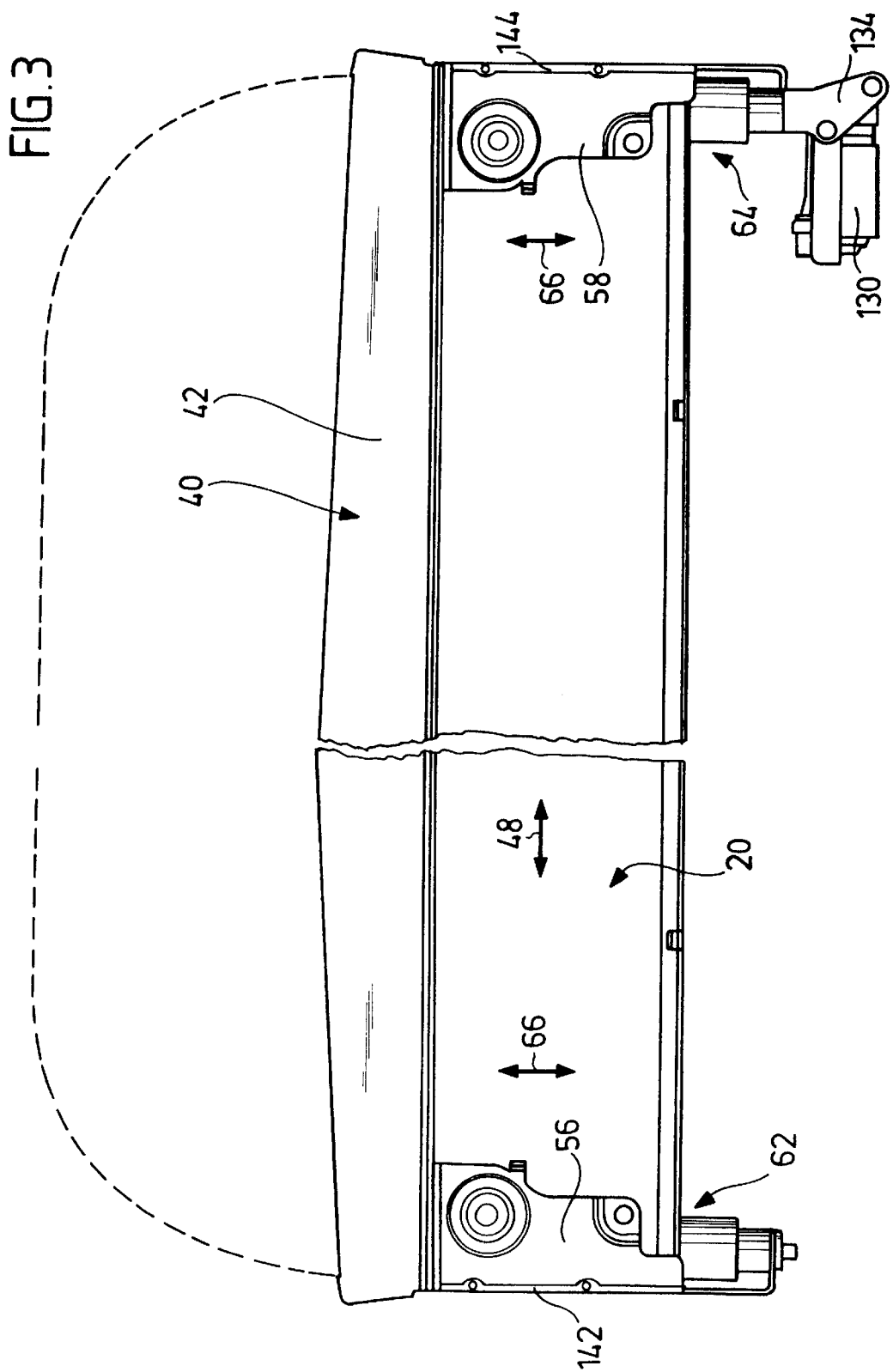
Figure 5:
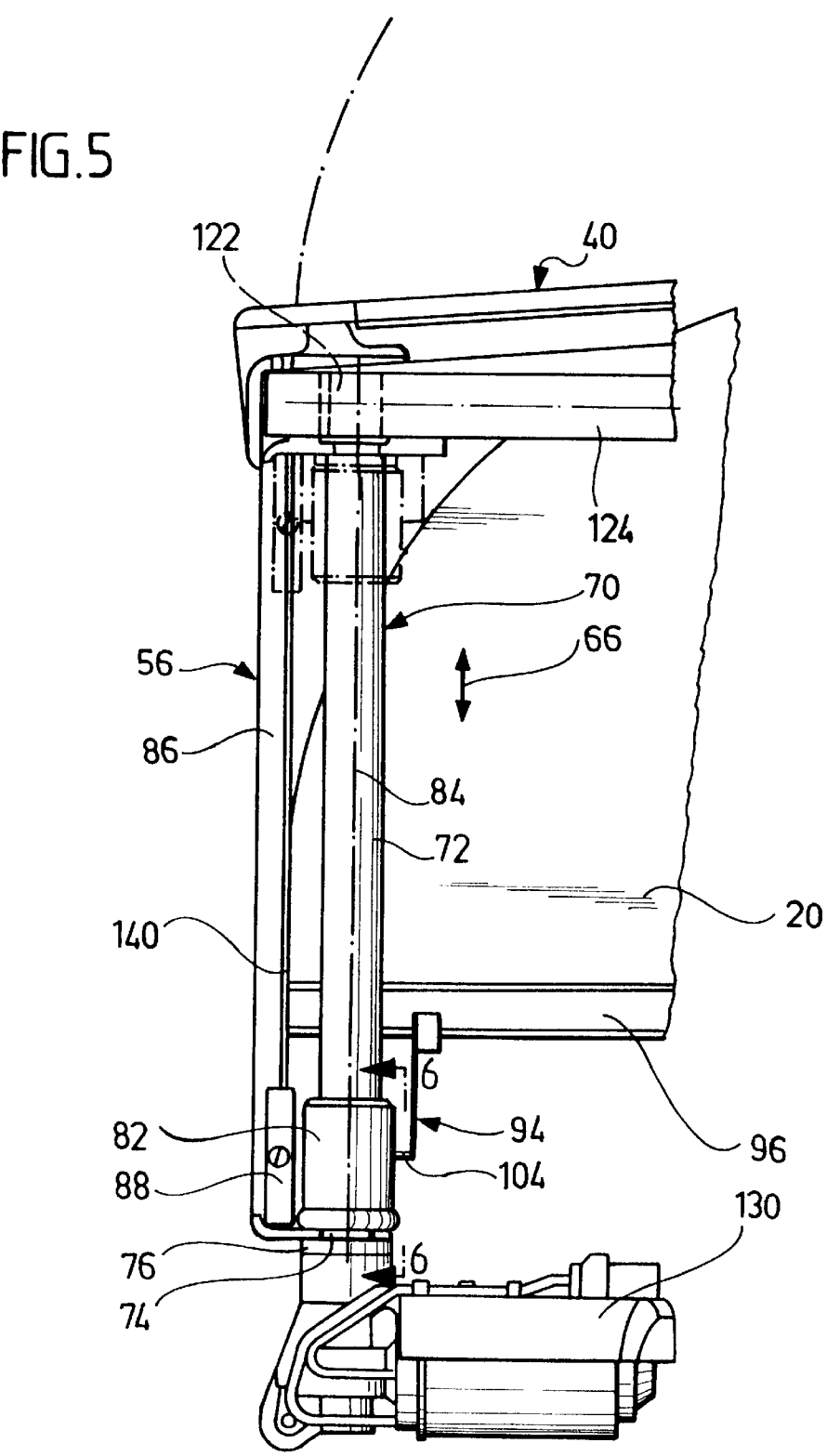
Figure 6:
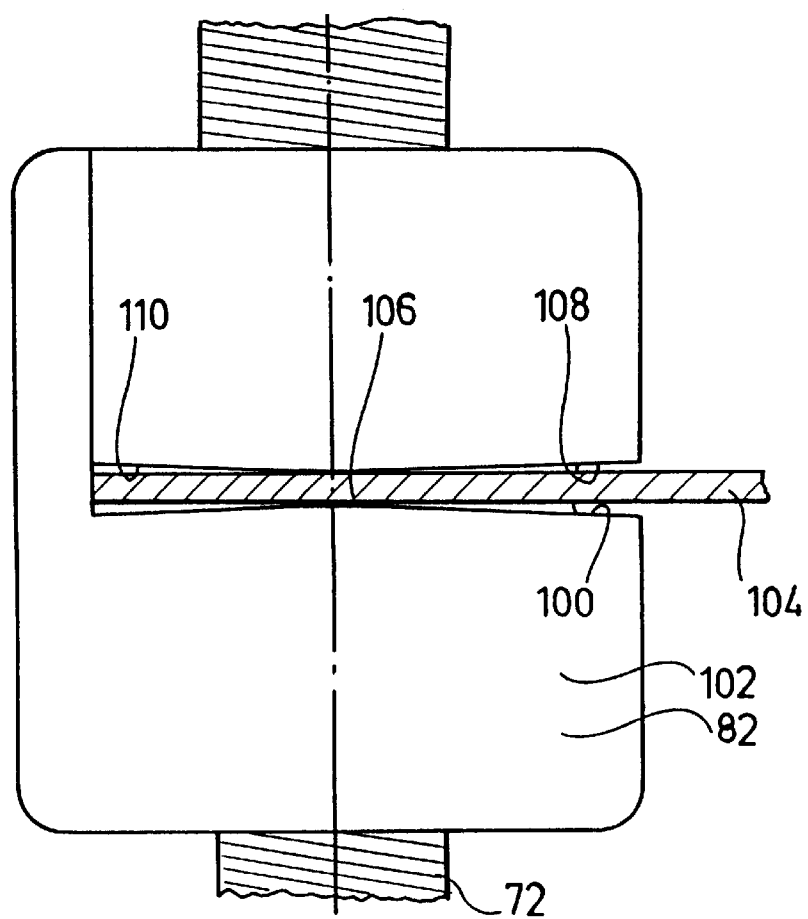

FIG. 1 a schematic illustration of a motor vehicle with a wind stop device according to the invention;

FIG. 2 a vertical section through a first embodiment of a wind stop device according to the invention along line 2–2 in FIG. 4;

FIG. 3 a front view of the first embodiment of the wind stop device according to the invention;

FIG. 4 a rear view of the first embodiment of the wind stop device according to the invention;

FIG. 5 an enlarged illustration of the first embodiment according to FIG. 4 in the area of the lifting unit with drive depicted in FIG. 2;

FIG. 6 an enlarged illustration of a section along line 6–6 in FIG. 5; and

Figure 7:
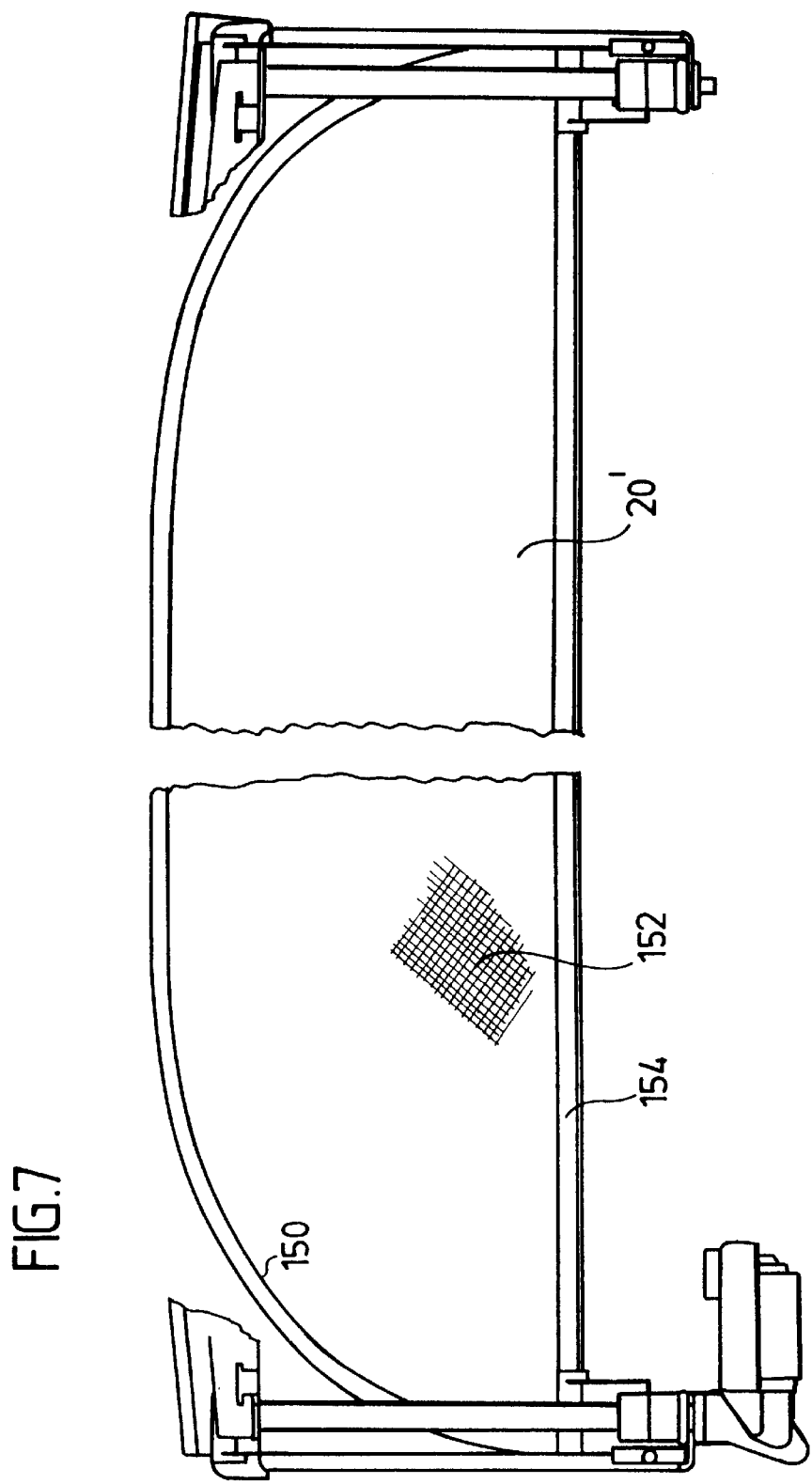

FIG. 7 a view similar to FIG. 4 of a second embodiment of a wind stop device according to the invention.

In a motor vehicle generally designated 10 with a body 12, a first embodiment of a wind stop device, generally designated 14, is arranged, for example, behind a front row of seats 16 including the driver's seat. The wind stop device 14 comprises a wind stop element 20, which, when standing in its active position, projects above a girth line 22 of the body 12 and behind the front row of seats 16 causes a turbulence 24 forming behind the motor vehicle 10, of an air stream 28 flowing across a top side 26 of the body 12, to remain at a tear side of the body 12 facing away from the row of seats 16 and not to extend into a space 30 containing the shoulder, neck and head of the passengers seated on the row of seats 16.

The wind stop device 14 further comprises a holder 32, which is arranged in a receiving space 34 provided therefor in the body 12 and is designed so as to allow the wind stop element to move from its active position illustrated in FIG. 1, in which it projects upwardly above the girth line 22, to an inactive position in the receiving space 34, in which the wind stop element 20 is arranged entirely within an outer contour of the body 12.

As illustrated in FIGS. 2 to 5, the holder 32 comprises an upper crossbeam 40, including a front carrier plate 42 and a rear carrier plate 44, each of which extends in a transverse direction 48 transversely to a longitudinal direction 46 of the body 12 and essentially across the breadth of the body 12. The crossbeam 40 is located near an upper side 50 of the body 12 in the receiving space 34. The crossbeam 40 preferably forms an upper through-opening 52 for the wind stop element 20, which guides the wind stop element near the upper side 50 of the body 12 and preferably lies in the area of an exit opening 54 provided in the body 12 for the wind stop element 20.

As illustrated in FIG. 3, the crossbeam 40 is provided with side supports 56 and 58 which are arranged at a distance from one another in the transverse direction 48 and starting from the crossbeam 40 extend into the receiving space 34 of the body 12 in the direction of a base assembly 60 of the latter (FIG. 1).

Each of the side supports 56, 58 is provided with a lifting unit 62, 64, which serve to move the wind stop element 20 in a lifting direction 66 extending transversely to the girth line 22 of the body 12 and transversely to the base assembly 60, preferably in an approximately vertical direction.

Each of the lifting units 62, 64 comprises, as illustrated in FIGS. 2 and 4, a lifting transmission 70, consisting of a lifting spindle 72 which is mounted both axially and radially on the respective side support 56 or 58 in the area of the lower end 74 with a lower bearing 76 and in the area of the upper end 78 with an upper bearing 80.

Arranged on the lifting spindle 72 is a spindle nut 82, which by turning the lifting spindle 72 is movable in the lifting direction 66 parallel to an axis 84 of the respective lifting spindle 72.

Furthermore, each of the lifting units 62 and 64 is also provided with a lifting guide 86 which preferably extends parallel to the axis 84 of the lifting spindle 72 and along which a guide member 88 is movable. The lifting guide 86 is preferably formed by a bar 90 arranged on the respective side support 56, 58. When the side support 56, 58 is in the form of a sheet metal part, the bar 90 is formed by a shaped sheet metal edge. This bar is engaged on both opposing surfaces by a U-shaped, formed part 92 designed as guide member 88.

The guide member 88 itself is arranged on a lifting guide holder 94 which is connected to the spindle nut 82 and is also fixedly connected to a lower guide bar 96 which is arranged on the wind stop element 20 and preferably extends in the transverse direction 48 between the two lifting guide holders 94 associated with the respective lifting units 62, 64.

The lifting guide bar 96 is, for example, designed so as to receive a lower edge 98 of the wind stop element 20 in the shape of a U.

FIG. 6 shows an enlarged illustration of the section along line 6–6 in FIG. 5. As seen in FIG. 6, lifting spindle 72 has external threads corresponding to the internal threads of the spindle nut 82 (not shown).

"To ensure an easy running of the spindle nut 82 and prevent an excess geometrical determination of the lifting guide holder 94, guided via the guide member 88 on the lifting guide 86, with respect to the spindle nut 82, it is preferably provided for the connection between the lifting guide holder 94 and the spindle nut 82 to be effected via a bar 104 of the lifting guide holder 94 engaging with a groove 100 in a side wall 102 of the spindle nut 82, with the groove 100 having a central portion 106 guiding the bar 104 precisely and outer portions 108 and 110, which allow a tilting movement of the bar 104 of the lifting guide holder 94, so that the latter is tiltable with respect to the spindle nut 82 and, more specifically, runs in a plane 112 which is vertical to the transverse direction 48 and parallel to the axis 84 of the lifting spindle 72."

"In order to synchronize the movement of the spindle nuts 82 in the lifting direction 66, both lifting units 62 and 64 are coupled via a connecting transmission 120 comprising a toothed belt pulley 122 arranged in the area of the top end 78 of the respective lifting spindle 72, and a toothed belt 124 connecting the two toothed belt pulleys and extending in the transverse direction 48 within the crossbeam 40, preferably near the rear carrier plate 44, and coupling the two toothed belt pulleys 122 with one another."

Furthermore, for driving the two lifting spindles 72, coupled via the connecting transmission 120, an electric drive motor 130 is provided, which is held on one of the side supports 56, 58, for example, on the side support 58, preferably at a lower end 132 thereof, and which drives the lifting spindle 72 associated with this side support 58 in the area of its lower end 78.

In order to drive the lifting spindle 72 associated with the side support 58 in the area of its lower end 78, the drive motor 130 is preferably provided with a transmission 134, preferably in the form of an angular gear.

In order to construct the wind stop device 14 according to the invention as narrow as possible in the transverse direction 58, it is preferably provided for the lifting transmission 70 to lie within an maximum extension of the wind stop element 20 in outer side edges 138 and 140 defining the transverse direction 58 and preferably for only the side supports 56 and 58 to lie with their outer side parts 142 and 144 carrying the lifting guides 86 in the transverse direction 48 outside the side edges 138 and 140.

Furthermore, as illustrated in FIG. 2, the lifting spindles 72 lie with their axes 84 in a plane $E_1$ extending approximately parallel to, but at a distance from the wind stop element 20 in the inactive position, and the lifting guides 86 also extend in a plane $E_2$ extending at a distance from the wind stop element 20 in the inactive position and approximately parallel, and, when seen in the transverse direction 48, lie at the most approximately in the area of the side edges 138, 140.

Thus, as illustrated in FIGS. 2 and 5, by synchronously driving the two lifting spindles 72, the wind stop element 20 can be driven out of the receiving space 34 in the lifting direction 66 from its inactive position in the receiving space 34, and the lifting guide holders 94 move from their position standing near the lower end 74 of the lifting spindles 72 in the direction of a position standing near the upper end 78 of the lifting spindles 72, and by displacing the lower guide bar 78, the wind stop element 20 can be moved through the through-opening 52 in the crossbeam 40 from the inactive position to the active position, and, as illustrated in FIGS. 3, 4 and 5 by a dashed line, the wind stop element 20 can be fixed in the active position by being fixed, on the one hand, by the through-opening 52 relative to the crossbeam 40 and thus on the holder 32, and, on the other hand, by the lower guide bar 96, which in the lifting direction 66 stands at a distance from the through-opening 52 and itself is supported via the lifting guide holders 94 on the lifting guides 86 of the side supports 56, 58.

Similarly, in the inactive position, too, the wind stop element 20 is guided, on the one hand, by the through-opening 52 and, on the other hand, by the lifting guide holders 94 and their relative guidance via the guide members 88 on the lifting guides 86.

In the first embodiment, the wind stop element 20 is preferably designed as a plate-shaped part made of a rigid, preferably transparent material, which is fixed in the lower guide bar 96 which engages around the lower edge 98 of the wind stop element 20 in the shape of a U.

In a second embodiment illustrated in FIG. 7, it is, however, also conceivable to design the wind stop element 20' so as to comprise a rigid frame 150 covered with a covering 152 which is pervious to air but impervious or slightly pervious to an air current, with a lower frame leg 154 of the frame 150 preferably replacing the lower guide bar 96 so that the lifting guide holders 94 are held directly on this lower frame leg 154.

What is claimed is:

1. Wind stop apparatus for motor vehicles, comprising:
 a wind stop element, and
 a holder for the wind stop element mountable so as to engage a receiving space of a motor vehicle body,
 said wind stop element being mounted on said holder in such a way that it can be brought from an active position projecting above a girth line of the motor vehicle body to an inactive position lying essentially within an outer contour of the motor vehicle body and vice versa,
 the wind stop element being transferable between the inactive position and the active position by means of a lifting device,
 said lifting device comprising two lifting units arranged at a distance from one another in a transverse direction and said two lifting units being commonly driven by a single electric motor.

2. Wind stop apparatus as defined in claim 1, wherein the holder comprises two supports on which the lifting units are arranged, said supports being arranged at a distance from one another in the transverse direction and extending in a lifting direction.

3. Wind stop apparatus as defined in claim 1, wherein the wind stop element is guided in all positions by means of an exit guide arranged near an exit opening provided for said wind stop element in the body.

4. Wind stop apparatus as defined in claim 3, wherein the exit guide is arranged on the holder.

5. Wind stop apparatus as defined in claim 1, wherein the lifting units are coupled with one another in such a way that all the positions of the wind stop element attainable via the lifting units are aligned parallel to one another.

6. Wind stop apparatus for motor vehicles, comprising:
 a wind stop element, and
 a holder for the wind stop element mountable so as to engage a receiving space of a motor vehicle body,
 said wind stop element being mounted on said holder in such a way that it can be brought from an active position projecting above a girth line of the motor vehicle body to an inactive position lying essentially within an outer contour of the motor vehicle body and vice versa,
 the wind stop element being transferable between the inactive position and the active position by means of a lifting device,
 said lifting device comprising two motor driven lifting units arranged at a distance from one another in a transverse direction,
 said two lifting units being movable in mechanical synchronization with one another.

7. Wind stop apparatus for motor vehicles, comprising:
 a wind stop element, and
 a holder for the wind stop element mountable so as to engage a receiving space of a motor vehicle body,
 said wind stop element being mounted on said holder in such a way that it can be brought from an active position projecting above a girth line of the motor vehicle body to an inactive position lying essentially within an outer contour of the motor vehicle body and vice versa,
 the wind stop element being transferable between the inactive position and the active position by means of a lifting device,
 said lifting device comprising two lifting units arranged at a distance from one another in a transverse direction,
 said lifting units being coupled with one another via a connecting transmission.

8. Wind stop apparatus as defined in claim 7, wherein the connecting transmission is arranged in the area of a crossbeam of the holder.

9. Wind stop apparatus as defined in claim 8, wherein the connecting transmission is arranged in the area of an upper crossbeam of the holder.

10. Wind stop apparatus as defined in claim 7, wherein the lifting units are drivable by a single electric drive.

11. Wind stop apparatus for motor vehicles, comprising:
a wind stop element, and
a holder for the wind stop element mountable so as to engage a receiving space of a motor vehicle body,
said wind stop element being mounted on said holder in such a way that it can be brought from an active position projecting above a girth line of the motor vehicle body to an inactive position lying essentially within an outer contour of the motor vehicle body and vice versa,
the wind stop element being transferable between the inactive position and the active position by means of a lifting device,
said lifting device comprising two lifting units arranged at a distance from one another in a transverse direction,
each of the lifting units comprising a lifting transmission which acts on the wind stop element.

12. Wind stop apparatus as defined in claim 11, wherein each lifting transmission comprises a lifting spindle with a spindle nut.

13. Wind stop apparatus for motor vehicles, comprising:
a wind stop element, and
a holder for the wind stop element mountable so as to engage a receiving space of a motor vehicle body,
said wind stop element being mounted on said holder in such a way that it can be brought from an active position projecting above a girth line of the motor vehicle body to an inactive position lying essentially within an outer contour of the motor vehicle body and vice versa,
the wind stop element being transferable between the inactive position and the active position by means of a lifting device,
said lifting device comprising two lifting units arranged at a distance from one another in a transverse direction,
at least one of said lifting units comprises a path guide extending in the lifting direction for the wind stop element.

14. Wind stop apparatus as defined in claim 13, wherein the path guide runs alongside the lifting transmission.

15. Wind stop apparatus as defined in claim 13, wherein the path guide is arranged on the supports.

16. Wind stop apparatus as defined in claim 11, wherein the wind stop element is coupled with each of the lifting transmissions via a lift bearing allowing a transverse tilt to the lifting direction.

17. Wind stop apparatus as defined in claim 1, wherein a space requirement of the lifting device does not substantially exceed a space requirement of the wind stop element in the inactive position.

18. Wind stop apparatus as defined in claim 17, wherein a space requirement of lifting units of said lifting device do not substantially exceed the space requirement of the wind stop element in the inactive position.

19. Wind stop apparatus as defined in claim 11, wherein the lifting transmissions lie in a plane approximately parallel to the wind stop element in its inactive position.

20. Wind stop apparatus as defined in claim 13, wherein the path guides run in a plane approximately parallel to the wind stop element in its inactive position.

21. Wind stop apparatus as defined in claim 1, wherein the wind stop element extends in all positions in the transverse direction and transversely to the girth line of the motor vehicle body.

22. Wind stop apparatus as defined in claim 1, wherein the wind stop element is constructed from a rigid material shaped like a plate.

23. Wind stop apparatus as defined in claim 14, wherein the wind stop element comprises a rigid frame with a covering.

24. Wind stop apparatus as defined in claim 1, wherein the wind stop element is form-invariantly movable between the active position and the inactive position.

* * * * *